Oct. 30, 1951 A. VAN DUYN 2,573,631
SLICING MACHINE
Filed Aug. 4, 1947
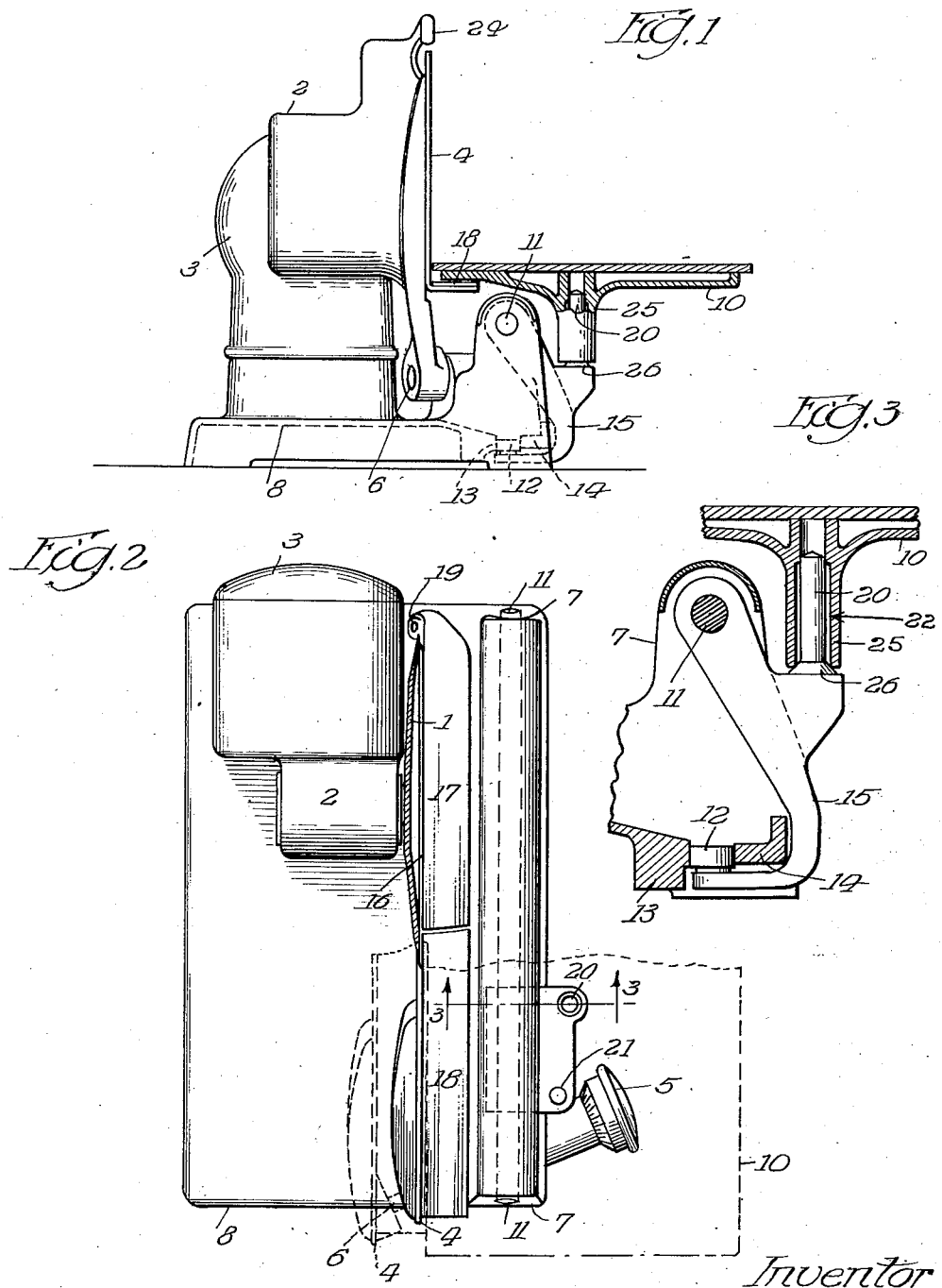
Inventor
Adrianus Van Duyn
By Spencer, Marzall, Johnston + Cook
Attys.

Patented Oct. 30, 1951

2,573,631

UNITED STATES PATENT OFFICE 2,573,631

SLICING MACHINE

Adrianus van Duyn, Hillegersberg, Rotterdam, Netherlands, assignor to U. S. Slicing Machine Company, Inc., a corporation of Indiana Application August 4, 1947, Serial No. 766,026
In the Netherlands September 12, 1942

Section 1, Public Law 690, August 8, 1946
Patent expires September 12, 1962

3 Claims. (Cl. 146—102)

This invention relates in general to slicing machines of the type having a reciprocable carriage that embodies two components that are interconnected to form a rigid structural unit, the upper component being the substance carrier and the lower component being a support which is reciprocable along one or more guides on the machine frame, being constrained by said guide or guides to longitudinal movement; that is to say, the support component is constrained against movement relative to the slicing plane.

The present invention embodies a machine of the type wherein the carrier component and the longitudinally guided component of the reciprocating carriage are interconnected to form a rigid structural unit by male and female joint members which take the forces due to the weight of the carrier component and the substance thereon, the reciprocating motion of the support component and the slicing action of the knife and which are disconnectible by the act of lifting the carrier component.

The present invention also embodies a slicing machine of the type stated wherein the carrier component and the longitudinally guided support component of the reciprocating carriage are interconnected to form a rigid structural unit by a pin in one component fitting into a hole in the other component, with or without another pin in one component fitting into a hole or other opening in the other component, said pin or pins being vertical or substantially vertical so that the carrier component can be detached by lifting it.

Therefore the arrangement is such that the two components of the reciprocating carriage are securely and rigidly interconnected in the operation of the machine and nevertheless the carrier component can be removed from the longitudinally guided support component simply by a lifting action.

In the drawing and in the present exemplification of the invention

Figure 1 is a sectional view of the machine as viewed from the front thereof, i. e. the end where the operator stands.

Figure 2 is a corresponding sectional plan, the upper component of the carriage being removed to show the joint members on the lower component.

Figure 3 is an enlarged detail sectional view on line 3—3, Figure 2.

The machine shown embodies the usual rotary knife 1, which is journaled in a knife bracket 2, being set at a slight inclination to the slicing plane. The knife is driven by a motor 3, preferably of the electric type. The thickness of the slice cut from the substance by the knife is regulated by a gage plate 4, which is adjustable in any manner well known in this art, by a regulator knob or handle 5, to give any selected slice thickness. The gage plate 4 is supported by one or more guide rods 6, which extend at an elevation into one or more guide bearings in the base 7, of the machine frame. The slice receiver of the machine consists of a platform 8, forming an extension of the base.

The reciprocable carriage includes at its upper component a substance carrier 10. The guides for the carriage include an upper round bar 11, secured at its ends to the base 7.

The lower guide means includes a roller 12, which runs between two opposed tracks 13, and 14, provided in the base 7. The roller 12, is journaled on the lower component of the reciprocating carriage, said lower component taking the form of a block like support 15, which is slidable on the bar 11.

As usual in such machines, a mask plate 16, is mounted in front of the knife, this mask plate being formed at the foot with an outwardly projecting horizontal flange 17, which assures a position flush with a similar flange 18, on the gage plate 4. The mask plate is pivotally supported at one side, the pivot being designated by the numeral 19, the arrangement being such that the mask plate may be swung aside from the knife to facilitate cleaning, a knife guard 24, being also provided.

In the form of the invention shown, the support 15, is provided with two upright pins 20 and 21, as a means whereby the carrier 10, is detachably connected to it. These pins are made to fit precisely into a similarly spaced pair of holes 22 provided in the underside of the carrier 10. As shown, the hole 22 constitutes a bore through a long neck 25, which projects vertically downwards from the carrier 10. The bore has a small sized upper portion and an enlarged lower portion which leads to the mouth of the hole. The pin 20 is comparatively long, its length being preferably several times as great as its diameter, and the size of the pin is such that it fits neatly the small sized top portion of the hole 22. The mouth of the hole engages and is accurately centered by the conical base 26, in the working position of the carrier 10, on the support 15.

The other hole provided in the underside of the carrier 10 may be a simple hole to receive and fit the pin 21. These parts serve mainly to hold the carrier 10, against turning about the axis of the pin 20, with which the neck 25 may be regarded as the main joining means in the form shown.

The arrangement is such that the joint members are well adapted to maintain a secure and rigid connection between the carrier 10, and the support 15, in the operation of the machine, the joint thus taking the forces due to the weight of the carrier and the substance upon it, the reciprocating motion of the support and the slicing action of the knife. Nevertheless in order to disconnect the carrier 10, it is only necessary to raise or lift it from the support.

While the preferred form of the invention is herein shown and described, it is to be understood that various changes may be made in the details of construction and in the combination and arrangement of the several parts, within the scope of the claims, without departing from the spirit of this invention.

What is claimed as new is:

1. A slicing machine embodying a reciprocable carriage, a substance carrier, means for connecting the carrier with the carriage for removal therefrom by lifting the carrier with respect to the carriage, said means embodying a pin on said carriage and provided with a conical base portion and a body portion of substantial length and of a diameter less than the diameter of said base portion, said carrier having a recess to receive said pin, said recess being provided with a portion to fit said pin, an enlarged portion which receives and fits said conical base portion of the pin, and an additional pin-and-socket connection between said carrier and said carriage spaced from said pin having the conical base and recess connection to prevent pivoting of the carrier relative to the carriage for maintaining the carrier against turning with respect to the carriage.

2. A slicing machine embodying a reciprocable carriage, a substance carrier, means for connecting the carrier with the carriage for removal therefrom by lifting the carrier with respect to the carriage, said means embodying a pin on said carriage and provided with a conical base portion and a body portion of substantial length and of a diameter less than the diameter of said base portion, said carrier having a recess to receive said pin, said recess being provided with a portion to fit said pin, an enlarged portion which receives and fits said conical base portion of the pin, and means for maintaining the carrier against turning with respect to the carriage comprising separable means interconnecting said carrier and carriage remote from said pin and recess.

3. A slicing machine embodying a reciprocable carriage, a substance carrier, means for connecting the carrier with the carriage for removal therefrom by lifting the carrier with respect to the carriage, said means embodying a pin on said carriage and provided with a conical base portion and a body portion of substantial length and of a diameter less than the diameter of said base portion, said carrier having a recess to receive said pin, said recess being provided with a portion to fit said pin, an enlarged portion which receives and fits said conical base portion of the pin, and means for maintaining the carrier against turning with respect to the carriage comprising an additional pin and recess connection for said carrier and carriage and spaced thereon from said first mentioned pin and recess.

ADRIANUS van DUYN.

REFERENCES CITED

The following references are of record in the file of this patent:

UNITED STATES PATENTS

| Number | Name | Date |
| --- | --- | --- |
| 1,044,895 | Luska | Nov. 19, 1912 |
| 1,641,180 | Lucey | Sept. 6, 1927 |
| 1,685,906 | Campbell | Oct. 2, 1928 |
| 1,863,317 | Wolff | June 14, 1932 |
| 2,043,850 | Folk | June 9, 1936 |
| 2,050,786 | Folk | Aug. 11, 1936 |
| 2,065,352 | Streckfuss | Dec. 22, 1936 |
| 2,199,267 | Meeker et al. | Apr. 30, 1940 |
| 2,388,588 | Wood | Nov. 6, 1945 |
| 2,400,279 | Wood | May 14, 1946 |
| 2,404,557 | Wood | July 23, 1946 |
| 2,410,698 | Wood | Nov. 5, 1946 |